May 27, 1958 R. D. McCOMB 2,836,147

RECORDING AND PORTRAYING APPARATUS

Filed Oct. 27, 1954 2 Sheets-Sheet 1

Inventor
Robert D. McComb
by Merton D. Morse
His Attorney

May 27, 1958 R. D. McCOMB 2,836,147

RECORDING AND PORTRAYING APPARATUS

Filed Oct. 27, 1954 2 Sheets-Sheet 2

Inventor
Robert D. McComb
by Merton D Moore
His Attorney

United States Patent Office 2,836,147

Patented May 27, 1958

2,836,147

RECORDING AND PORTRAYING APPARATUS

Robert D. McComb, Schenectady, N. Y., assignor to General Electric Company, a corporation of New York Application October 27, 1954, Serial No. 464,921

19 Claims. (Cl. 118—620)

This invention pertains to magnetic image recording and portraying apparatus of the type suitable for use with high speed computers or calculators.

Present day computers are capable of providing a great amount of information during a short interval of time. However, few recording and portraying devices are now available that are capable of operating at a corresponding rate of speed. Therefore, the computing apparatus often must stand idle until the information that it has made available is transformed into a useable recorded or portrayed form, and considerable time may be wasted. Accordingly, a primary object of this invention is to provide an apparatus for recording and portraying information that is capable of operation at a high rate of speed.

Another object of the invention is to provide a recording and portraying apparatus that provides a visible record practically immediately, and avoids the time delay inherent in those devices that utilize a photographic process.

A further object is to provide such an apparatus that is physically compact and relatively small in size.

A process for magnetically recording, storing and printing information has recently been developed to avoid many of the disadvantages of former recording and printing methods. That process, which has become known as ferromagnetography, is described in detail in copending application Serial No. 223,423, filed April 27, 1951 by T. M. Berry, and assigned to the same assignee as the present invention. Essentially, the process of ferromagnetography comprises forming a magnetic image in the form of localized magnetic fields in a high retentivity magnetic material, the configuration of the invisible localized fields or flux patterns being a pictorial representation of the object or information ultimately desired to be transformed into a visible or otherwise useable form. The magnetic image thus formed is developed or made visible by bringing minute magnetic particles into the magnetic attracting influence of the material containing the impressed magnetic image, with the result that the particles adhere to the material in the form of the image. The particles magnetically retained by the image may then be utilized to produce printed records.

High speed recording and portraying apparatus constructed in accordance with the present invention utilizes the process of ferromagnetography. The apparatus comprises a high retentivity magnetic material formed in the shape of a cylinder, and one or more wheels arranged substantially tangentially to the high retentivity magnetic cylinder. Characters are formed about the circumference of the wheels and coil means are arranged in flux-linking relationship to the character bearing wheels. The coil means are so positioned that, as the character bearing wheels rotate and a character moves into position adjacent the surface of the high retentivity magnetic cylinder, the coil may be energized to cause the surface of the high retentivity magnetic cylinder to be magnetized in the form of the character.

The magnetic image thus produced is developed or made visible by bringing minute magnetic particles into the attracting influence of the magnetic image, whereby some of the particles adhere to the ferromagnetic cylinder in the form of the impressed magnetic image. Means are provided to wipe or brush off excess minute magnetic particles that may have adhered to the surface of the ferromagnetic cylinder because of mechanical adhesion, surface energy or other attracting influences, and to realign with the fields of the magnetic image those particles remaining on the ferromagnetic cylinder after the excess particles have been removed.

The novel features which are believed to be characteristic of the invention are set forth with particularity in the appended claims. The invention itself, however, both as to its organization and method of operation, together with further objects and advantages thereof, may best be understood by reference to the following description, taken in conjunction with the accompanying drawings, in which Fig. 1 is a perspective view of apparatus constructed in accordance with the invention, with the supporting structure removed for the sake of clarity;

Figures 1, 8, 9:
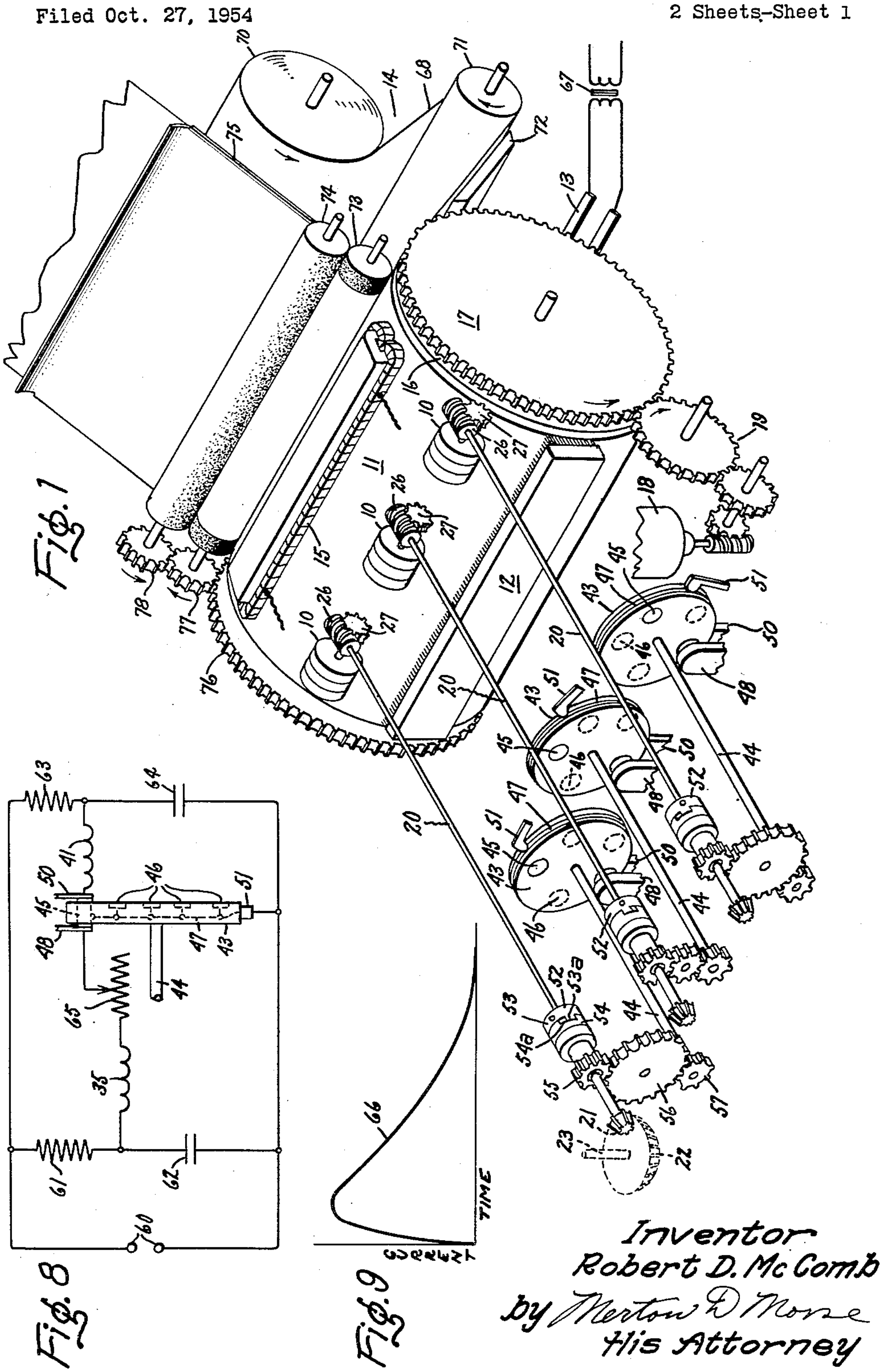
Fig. 8 is a diagram of a portion of the electrical circuit of the apparatus.
Fig. 9 is a graph useful in understanding the operation of the electrical circuit.

Referring now to Fig. 1, the embodiment of the invention there shown comprises, in general, a plurality of counters 10, whose reading is to be recorded and printed, a ferromagnetic member in the form of a cylinder 11 on which the reading of the counters 10 is impressed in the form of localized magnetic fields, developing means that includes a developer tray 12 for bringing minute magnetic particles into contact with the surface of the ferromagnetic cylinder 11 to develop or make visible the magnetic image impressed thereon, a coil, the terminals of which are shown at 13, for aligning the minute magnetic particles with the magnetic field of the impressed magnetic image, a printing assembly 14 for printing the developed image, and an erasing head 15.

The word "ferromagnetic" is used herein to define a substance whose magnetic permeability is considerably above that of air and varies at different values of flux density. Ferromagnetic materials have the marked magnetic effects exhibited, for example, by iron, nickel and cobalt. The expression "retentivity" herein employed defines the ability of the magnetic material to retain its magnetization once it is magnetized, and "coercivity" is the magnetic force that must be applied in a reversed direction to a magnetized body to remove its residual magnetization. The present invention is in no way limited to the use of any particular material for the ferromagnetic cylinder 11, so long as the material has high retentivity and is capable of localized surface magnetization. However, it has been found that the alloys known as cunico (29% cobalt, 21% nickel and 50% copper) and cunife (60% copper, 20% nickel and 20% iron), are well suited to this use.

The high retentivity ferromagnetic cylinder 11 is supported on a drum 16, which is preferably constructed of a relatively high permeability, low coercivity, magnetic material such as soft iron or low carbon content steel. However, the material of which the drum 16 is constructed is not of critical importance, and it need not necessarily possess magnetic properties. The drum 16 has a gear 17 formed or secured to one end thereof, and the drum is rotated about its axis by a motor 18 acting through a conventional gear train 19 that drives the gear 17 formed on the drum. The drum rotates at essentially a constant speed, in the present instance.

In the particular form of the invention illustrated, information is recorded on the ferromagnetic cylinder 11 from three 3-digit counters 10. However, the invention is in no way limited to the use of any particular number of counters or even to the use of counters. Each of the three digit counters 10 might be replaced by counters having any desired number of digits, or the counters might be replaced by devices bearing letters rather than numerals. In the latter case, a sufficient number of devices could be employed to print a word or a name, and if a combination of letters and numerals were used on the rotating wheels, items such as names and addresses might be recorded and printed.

In the present case, each of the counters 10 is actuated by an input shaft 20, and each input shaft 20 may be driven through a pair of level gears 21 and 22 by an output shaft 23 of a device such as a computer or calculator. Although only one output shaft 23 is shown, it is understood that each of the counter input shafts 20 may be driven in a similar manner.

Figures 2, 7:
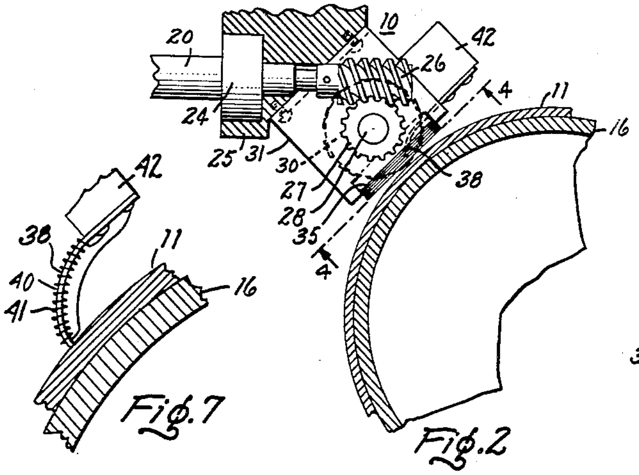
Fig. 2 is an enlarged side view of the means for impressing the magnetic image on the surface of the ferromagnetic cylinder.
Fig. 7 is an enlarged side view of an auxiliary marking device employed in the apparatus.

Referring now to Fig. 2, which shows the counter driving mechanism in detail, it is seen that the input shaft 20 extends through a bearing 24 mounted in the frame structure 25, and has a worm 26 secured to the end thereof. The worm 26 engages a worm wheel 27 that is mounted on the counter axle 28.

The counters 10 are of conventional construction and comprise a plurality of wheels 30 (Fig. 3) having raised characters **30*a* on their peripheral surfaces. In the usual method of operation of such counters, the counter axle 28 drives one of the counter wheels 30, which in turn advances a second wheel through a conventional "Geneva drive" mechanism, and so on. In the present case, the gear ratio between the worm 26 and worm wheel 27 is such that for each rotation of the input shaft 20 the first counter wheel advances one character. Thus, if input shaft 20** is rotated 10 times, the first counter wheel makes one complete revolution and advances the second counter wheel one character. Such counters and their operation are well known in the art and detailed explanation is believed unnecessary.

Each counter is mounted on the frame structure 25 in a U-shaped bracket 31 so that the peripheries of the counter wheels 30 and the ferromagnetic cylinder 11 are approximately tangent. It is pointed out, however, that the raised characters **30*a* on the counter wheels 30 do not actually contact the surface of the ferromagnetic cylinder 11**, but may be spaced therefrom by several thousandths of an inch to avoid wear.

Figure 3:
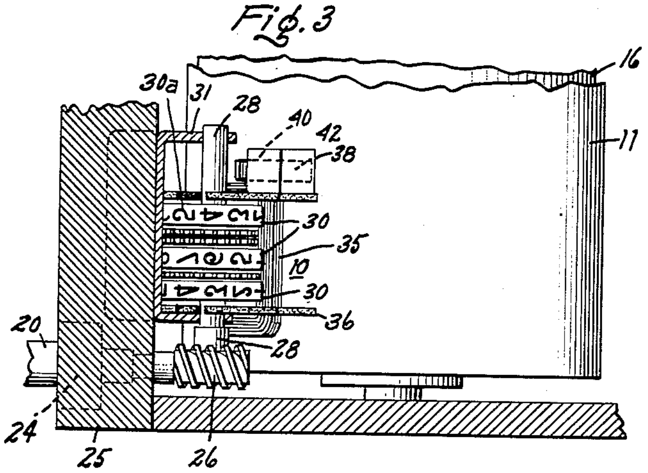
Fig. 3 is a plan view of the elements shown in Fig. 2.
Figure 4:
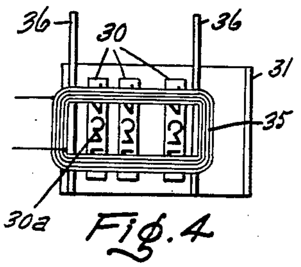
Fig. 4 is a view taken on the line 4—4 of Fig. 2.

A substantially flat, rectangular coil 35 is mounted in a plane substantially tangent to the surface of the ferromagnetic cylinder 11 and to the wheels 30. The plane of the coil is essentially parallel to the axes of the counters and the ferromagnetic cylinder 11, and the coil is so located that the raised characters **30*a* on the circumferences of the counter wheels 30 lie essentially in the plane of the coil, when they are nearest the surface of the ferromagnetic cylinder 11. Looking at Fig. 4, it is seen that the coil appears as a frame in which one at a time the raised characters on each of the counter wheels appear. As best seen in Fig. 3, the coil 35 is wound on a form 36** made of an insulating material, and the form extends upwardly outside the counter wheels to act as a shield for the wheels.

Figure 5:
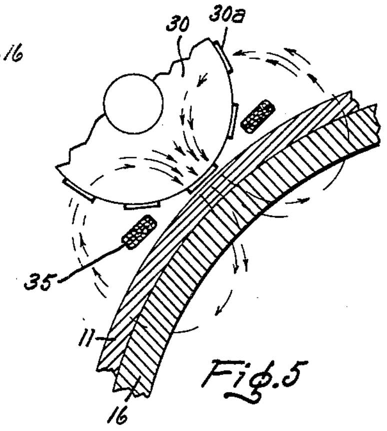
Fig. 5 is a diagrammatic sectional view of the means for impressing the magnetic image on the ferromagnetic cylinder and showing the paths of magnetic flux.

Reference is now made to Fig. 5, which shows diagrammatically the method of locally magnetizing the surface of the ferromagnetic cylinder 11 in the shape of the characters **30*a* about the periphery of each counter wheel 30. The counter wheel 30 is shown in a position such that a raised character 30*a* is adjacent the surface of the ferromagnetic cylinder 11. If, at this time, the coil 35 is energized, a magnetic field will be produced with the magnetic flux flowing approximately in the directions shown by the arrows in Fig. 5. Because the reluctance of the magnetic path into the drum from the raised character is less than that from the adjacent portions of the counter wheel, which are spaced farther from the drum than is the character, there is a flux concentration through the raised character. Thus, the surface of the ferromagnetic cylinder 11 is locally magnetized in the shape of the character. In the present case, the coil 35** is energized by current flowing in one direction, and so far as the magnetizing action is concerned, it is immaterial whether the flux flows in the direction indicated by the arrows in Fig. 5 or in the reversed direction.

It is now apparent from a study of Fig. 5 that the raised characters **30*a* must be made of magnetic material. For the sake of convenience, the raised characters are generally constructed integrally with the counter wheel by molding or the like, and, therefore, both the counter wheels 30 and the raised characters 30*a* are constructed of a magnetic material. This is not necessary, however, and in some cases it may be desirable to have only the raised characters possess magnetic properties. It is also apparent that various modifications of the construction of the counter wheel may be made. For example, if the counter wheels are constructed of magnetic material, the characters 30*a* may be depressed below the peripheral surface of the wheel rather than raised above the surface; that is, the characters may be engraved rather than embossed. In that case, magnetic flux will flow through the area around the characters to magnetize the surface of the ferromagnetic cylinder 11**, and the character will be defined by the unmagnetized region.

Figure 6:
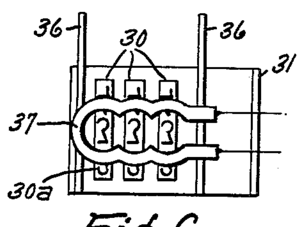
Fig. 6 is a view similar to Fig. 4 but showing a modified arrangement of the image impressing means.

Referring now to Fig. 6, there is shown a modified arrangement for impressing on the ferromagnetic cylinder 11 the magnetic image of the characters on the counter wheels. The necessary magnetic flux is produced by a single turn coil 37, which is located in essentially the same position with respect to the counter wheels 30 as is the coil 35 previously described. In this case, however, the coil may be formed of a thin strip or sheet of metal that is punched out of the desired configuration to partially enclose the raised characters **30*a* when they are closest to the surface of the ferromagnetic cylinder. The coil 37 is preferably connected to the secondary winding of a transformer to provide high current flow therethrough. The magnetic field produced by the coil 37 is essentially the same as that shown in Fig. 5, and the image is impressed on the surface of the ferromagnetic cylinder 11 in the same manner as previously described. The particular advantage of the form of flux producing means shown on Fig. 6 is that the single turn coil may more closely enclose the raised numerals 30*a* on the counter wheels than can the multiturn coil 35** previously described, and thus an increased amount of magnetic flux is concentrated in a path through the character being printed.

If the rotation of an input shaft 20 is such that a character on the counter wheel is not in the position shown in Fig. 5, a record of the reading of the counter cannot be made because a clean clear-cut image of the character cannot be recorded on the ferromagnetic cylinder. In order to record those movements of the input shafts of less than one complete revolution, a marker assembly 38 is provided on each counter mechanism and is mounted on the side thereof (Fig. 3). The marker assembly, which is shown in detail in Fig. 7, comprises a marker member 40 constructed of a magnetic material, and a coil 41 wound about the marker member 40. In the present case, the marker 40 is of curved blade-like shape, but it may be of any desired form that will function in the manner to be described. The member 40 is secured to a block 42 which in turn is supported from the counter mechanism so that the tip of the member 40 is located adjacent to but not contacting the surface of the ferromagnetic cylinder 11, and is substantially aligned on the line of tangency between the cylinder and the wheels 30. Binding posts may be provided on the block 42 for electrical connections to the coil 41. When the coil 41 is energized, it creates a magnetic field with magnetic flux directed through the member 40 and into the ferromagnetic cylinder 11 to magnetize the surface of the cylinder in the shape of the tip of the member 40. As will be hereafter described in detail, the coil 41 of the marking assembly 38 may be energized at various rotational positions of the input shaft 20 of the counter so that any desired number of marks may be provided intermediate the recorded readings of the counter.

It is apparent from the foregoing description that control means must be provided to energize each counter coil 35 only when the characters on the counter wheels are in the proper positions adjacent the ferromagnetic recording cylinder (one during each revolution of the input shaft) and to energize each marker assembly coil 41 at times corresponding to fractions of a revolution of the input shaft. As seen in Fig. 1, the control means comprise a commutator wheel 43 for each counter mechanism that is mounted on a shaft 44 connected to the input shaft 20 through coupling means to be later described in detail. The commutator wheels 43 serve both to control the times at which the counter coils are energized to record the readings of the counters and to control the times of energization of the marking assembly coils to record marks between readings of the counters. One side of each commutator wheel is provided with a single contact button 45, and the other side of the commutator wheel is provided with a plurality of contact buttons 46 equally spaced about the commutator. The contacts 45 and 46 are electrically connected to an edge conductor 47, which extends about the periphery of the commutator wheel. In the present case, five buttons 46 are provided and one of them may conveniently be extended through the wheel to provide the button 45. The assembly also includes a brush 48 arranged to contact button 45 as the commutator wheel rotates, a brush 50 positioned to contact the button 46, and a brush 51 in continuous contact with edge conductor 47. The circuit to the counter coil is completed through contact 45 and brush 48, and the circuit to the marker assembly coil is completed through the contacts 46 and brush 50, as will be later explained. Thus, it is apparent that the reading of the counter will be recorded on the ferromagnetic cylinder once for each revolution of the commutator wheel and five marks will be placed on the record by the marker assembly for each rotation of the commutator wheel. Of course, one of the marks will coincide in time with the reading of the counter. Any desired number of contact buttons 46 may be located on the commutator wheel 43, and the invention is in no way limited to the use of five such contacts. Of course, the commutator wheel must be initially positioned so that contact 45 reaches brush 48 at the same time that the characters on the counter wheels are closest to the surface of the ferromagnetic cylinder, as shown in Fig. 5.

It is apparent that if the commutator wheel 43 were driven directly by the input shaft 20 and the commutator wheel were initially adjusted with the input shaft rotating in one direction, when the input shaft is rotated in the opposite direction, contact would be made between the brushes and the contacts of the commutator wheel at times when the characters on the counter wheels were not in proper position to be recorded. Also, the marks recorded between readings would be incorrectly positioned in time. This would occur because of the finite width of the brushes 48 and 50 and the contact buttons 45 and 46. In order to prevent this occurrence, the commutator wheel is driven from the input shaft 20 through a backlash coupling 52. The backlash coupling 52 comprises a collar 53 pinned or otherwise secured to the input shaft 20, and having a tooth **53*a*** formed thereon. The tooth 53*a* rides in a slot **54*a* in the end of a sleeve 54 that is rotatably mounted on the input shaft 20**. The slot 54*a* in the sleeve 54 is wider than the tooth **53*a* on the collar 53, so that when the input shaft 20 is rotating in one direction the tooth 53*a*** engages one side of the slot 54*a*, and when the input shaft 20 is rotaing in the opposite direction the tooth **53*a*** engages the other side of the slot 54*a*. Thus, when the input 20 changes its direction of rotation, transmission of the rotation of the shaft 20 to the sleeve 54 may be delayed by an amount depending upon the relative widths of the slot **54*a*** and the tooth 53*a*. Also mounted on the sleeve 54 is a spur gear 55, which through an idler gear 56 drives a gear 57 mounted on the shaft 44, on which the commutator wheel 43 is mounted. Thus, as the input shaft 20 changes its direction of rotation, that change is not transmittted to the commutator wheel 43 until the input shaft has rotated in the reversed direction through an angle equal to the sum of the angular widths of the contact and the brush. In this manner, the brushes 48 and 50 always make contact with the buttons 45 and 46 at the proper times regardless of the direction in which shaft 20 is turning.

Fig. 8 is a diagram of the electrical circuit for energizing the counter coils and the marker coils. It is pointed out that all of the counter mechanisms are provided with identical circuits, although only one is illustrated and will be described. A pair of input terminals 60 are provided for connection to a suitable source of direct current voltage. The input terminals 60 are connected to two parallel branches, the first comprising a resistor 61 and capacitor 62 connected in series, and the second comprising a resistor 63 and a capacitor 64 connected in series. The counter mechanism coil 35 and a variable resistor 65 are connected in series across the capacitor 62 through the commutator brush 48, button 45, edge conductor 47 and brush 51. The marker assembly coil 41 is connected across the capacitor 64 through the commutator brush 50, buttons 46, edge conductor 47 and brush 51. As the commutator 43 rotates and the brush 48 is not in contact with the button 45, capacitor 62 charges through resistor 61 to substantially the value of the input voltage connected to the terminals 60, which may be of the order of 120 volts D. C. Then, when the brush 48 contacts the button 45, the capacitor 62 discharges through the coil 35 and resistor 65 to energize the counter coil 35 and produce the magnetic flux that magnetizes the surface of the ferromagnetic cylinder in the form of the characters on the counter.

Fig. 9 is a graph having current as its ordinate and time as its abscissa, and the curve 66 represents the current pulse through counter coil 35 when the capacitor 62 discharges. Because it must be assumed that the counter wheels may be continuously moving, the current pulse through the counter coil 35 must be relatively short in order to "stop" the movement of the counter wheels; that is, the time constant of the circuit composed of capacitor 62, coil 35 and variable resistor 65 must be relatively short. It has been found that proper operation may be obtained if the capacitor 62 has a value of 12 microfarads and the variable resistor 65 has a value of 10 ohms, when the counter coil comprises approximately 100 turns of .0063" diameter copper wire, suitably insulated. Of course, the values are only approximate, and are given by way of example only. When using elements of the approximate values set forth, the current pulse through the coil 35 may reach its peak value in 75–100 microseconds after the circuit is completed, and will have decreased to substantially zero in approximately 500 microseconds. Thus, when the counter coil 35 is energized by a pulse of such short duration, the motion of the counter wheels is essentially stopped. It is pointed out that the purpose of the variable resistors 65 is to provide sufficient damping to prevent oscillation of the resistance-inductance-capacitance circuit.

Referring again to Fig. 8, it is seen that the marker coil 41 is energized in a similar manner to the counter coil. As the commutator wheel 43 rotates and the brush 50 is not in contact with the buttons 46, capacitor 64 charges through resistor 63 to approximately the value of the input voltage. Then, when brush 50 contacts one of the buttons 46, capacitor 64 discharges through the coil 41. The coil 41 is wound of approximately 300 turns of insulated copper wire .0031" in diameter, which has an appreciable resistance, and, therefore, no additional resistance is needed in series therewith to prevent oscillations as the capacitor 64 discharges. The discharge circuit of capacitor 64 has an even shorter time constant than the discharge circuit of the capacitor 62, in order to provide a sharp marking pulse. It has been found in practice that the capacitor 64 may conveniently have a value of one microfarad, when the marker coil 41 is wound as described. These values, of course, are given as exemplary only.

It is noted that, in the present case, it is desired to record the reading of each counter once for each revolution of its input shaft, and to record marks between readings corresponding to movements of the input shaft amounting to fractions of a revolution. This need not always be the case, however. If the counter wheels are replaced by wheels bearing letters rather than numerals, it might be desirable to eliminate the marks from the record and to record the reading of the wheels only when they are arranged to spell out a word or a name. In this case, a switch may be inserted in series with the counter coil 35 to be manually or automatically actuated at the proper time. The commutator wheel would, in all probability, still be required to insure that the coil is energized only when a character is in its proper position to be recorded; that is, when a character is adjacent the surface of the ferromagnetic cylinder, as shown in Fig. 5.

After the image of the counter wheels or the marker has been recorded on the ferromagnetic cylinder in the form of localized magnetic fields, it must be developed or made visible. The apparatus illustrated in Fig. 1 embodies the developing and printing apparatus described in copending application, Serial No. 447,350, filed August 2, 1954, by J. P. Hanna, and assigned to the same assignee as the present invention. The present invention, however, is not limted to the use of any particular developing and printing method or apparatus. For example, developing and printing may be carried out by the method and apparatus described in copending application Serial No. 446,931, filed July 30, 1954 by R. V. Pohl, and assigned to the same assignee as the present invention. In addition, a number of suitable developing and printing methods are described in the copending application of T. M. Berry previously mentioned. Summarizing briefly, the apparatus shown in Fig. 1 embodies developing means that comprise a tray 12 and a clean-up or realigning coil whose end and terminals are seen at 13. The developer tray 12 is spaced from the counter mechanisms in the direction of rotation of the ferromagnetic cylinder and contains a developer powder in the form of minute magnetic particles, such, for example, as synthetic-magnetite ($Fe_2O_3$). As the ferromagnetic cylinder 11 rotates past the developer tray 12, the minute magnetic particles contained in the tray are attracted to the magnetized areas of the ferromagnetic cylinder and adhere to the surface of the cylinder in the form of the image. In order to remove unwanted particles, which may adhere to the surface of the ferromagnetic cylinder because of mechanical adhesion, surface energy or other attracting influences, the edges of the developer tray are provided with a brush-like material to wipe the surface of the cylinder.

In practice, it is difficult to adjust the pressure exerted by the brush-like wiper against the surface of the ferromagnetic cylinder to remove unwanted magnetic particles from the surface of the ferromagnetic cylinder without somewhat disarranging those particles adhering to the surface of the cylinder in the form of the magnetic image. Therefore, an aligning coil, the terminals of which are seen at 13, is provided for realigning the disarranged magnetic particles with the fields of the magnetic image recorded on the ferromagnetic cylinder. The aligning coil, which is considered to be a part of the developer assembly, is spaced from the developer tray in the directon of rotation of the ferromagnetic cylinder 11 and comprises a single turn of heavy wire that extends substantially from one end of the cylinder 11 to the other. The coil may be connected to the secondary winding of a transformer 67, whose primary winding is energized from the conventional alternating current source (not shown). The action of the aligning coil is described in detail in the application of J. P. Hanna referred to above, and it is believed sufficient for present purposes to state that it causes the minute magnetic particles adhering to the surface of the ferromagnetic cylinder to oscillate and dance about. As the ferromagnetic cylinder continues to rotate and the magnetic particles pass out of the magnetic fields produced about the coil, the particles align themselves with the magnetic fields of the recorded image. Thus, the definition of the developed image is markedly improved.

After the images have been developed, or made visible, the ferromagnetic cylinder 11 continues to rotate and the image approaches the printing assembly 14, where it is transferred to a print receiving member. The printing assembly illustrated is adapted for the use of a paper support as a print receiving member with the paper having a temperature sensitive adhesive coating on one side thereof. The paper support may be either opaque or transparent as desired. A paper manufactured by the Nashua Corporation, Nashua, N. H. and described by them as a modified WP1 coated paper, has been found suitable for this use, although the invention is not limited to the use of any particular type of print receiving member.

The invention is in no way limited to any particular method or apparatus for printing, and, several suitable methods are described in the copending application of T. M. Berry referred to previously. However, for purposes of illustration, the printing assembly 14 is shown as comprising a web of paper 68, a supply roll 70, a guide roller 71, a heater 72, feed rollers 73 and 74, and a guide 75. The paper 68 advances from the supply roll 70 around the guide roller 71 and is looped around the feed roller 73, and passes between the feed rollers 73 and 74. The feed roller 73 also serves as a pressure roller for pressing the adhesive coated surface of the paper against the surface of the ferromagnetic cylinder 11. Arranged adjacent the paper between the guide roller 71 and the feed roller 73 is the heater 72, which serves to bring the temperature of the paper to a point where the adhesive coating becomes tacky. Thus, when the adhesive coated side of the paper is pressed into contact with the ferromagnetic cylinder, the magnetic particles adhering to the surface of the cylinder in the form of the image are transferred to the surface of the paper to provide a permanent record. As the paper continues to advance through the guide 75 on its way to a take-up roll (not shown), the temperature of the paper drops and the adhesive becomes set. If desired, the printing assembly may be eliminated entirely, and the developed image thereby viewed on the surface of the cylinder 11. However, in most applications, a permanent form of record will be desired.

The paper is advanced at the same rate of speed at which the surface of the ferromagnetic cylinder 11 is moving. This is accomplished by means of a gear 76 formed on or attached to the end of the drum 16 on which the ferromagnetic cylinder 11 is mounted. The gear 76 engages a gear 77 secured to the axle of the feed roller 73, and the gear 77 in turn engages a gear 78 secured to the axle of the other feed roller 74. Therefore, because the rotating drum 16 which carries the ferromagnetic cylinder 11, also drives the feed rollers 73 and 74 to advance the paper, there is no danger of slippage between the paper and the ferromagnetic cylinder and the image transferred from the cylinder to the paper is clear-cut and definite.

The erasing head 15 may be positioned adjacent the surface of the cylinder 11 between the printing assembly 14 and the counters 10. The erasing head may be a conventional electromagnet energized from a suitable A. C. source (not shown), that serves to demagnetize the surface of the ferromagnetic cylinder 11 before another magnetic image is recorded thereon.

It is now apparent that the present invention provides a high speed recording and portraying apparatus that attains the objectives set forth and fills a needed place in the art. The speed at which the device of the invention is capable of operating its limited primarily by the maximum speed of rotation of the counters. So far as the recording and printing apparatus itself is concerned, the ferromagnetic cylinder and the print receiving members are capable of relatively fast movement. In practice, it has been found that satisfactory operation may be obtained when the print receiving material is moving as fast as 5 inches per second. Thus, it is apparent that the apparatus of the invention is well suited for use with present high speed computors and that there is a negligible time delay between the presentation of information to the apparatus and the production of a visible record.

In a typical construction, the ferromagnetic recording cylinder may be approximately 5" long and 3" in diameter, and the entire recording and portraying apparatus may occupy a space of approximately one-third cubic foot. Thus, the apparatus is compact and of convenient size.

While a particular embodiment of the invention has been illustrated, it will of course be understood that the invention is not limited thereto since various modifications may be made therein, and it is contemplated by the appended claims to cover any such modifications as fall within the true spirit and scope of the invention.

What I claim as new and desire to secure by Letters Patent of the United States is:

1. A magnetic recording apparatus comprising a movable ferromagnetic member, at least one wheel supported in substantially tangential relationship with said ferromagnetic member, a plurality of magnetically permeable characters formed about the peripheral surface of said wheel, means for rotating said wheel, coil means mounted to substantially surround and to lie in the same plane as successive ones of said magnetically permeable characters as said wheel rotates, said coil means when energized being in flux linking relationship with said ferromagnetic member and successive ones of said characters during rotation of said wheel, and means for momentarily energizing said coil means.

2. A magnetic recording apparatus comprising a movable ferromagnetic member, at least one wheel supported in substantially tangential relationship with said ferromagnetic member, a plurality of magnetically permeable characters about the peripheral surface of said wheel, means for rotating said wheel, a substantially flat coil mounted in a plane substantially tangent to said wheel, said coil when energized being in a flux linking relationship with said ferromagnetic member and successive ones of said magnetically permeable characters during rotation of said wheel, and means for momentarily energizing said coil.

3. A magnetic recording apparatus comprising a movable ferromagnetic member, at least one wheel supported in substantially tangential relationship with said ferromagnetic member, a plurality of magnetically permeable characters about the peripheral surface of said wheel, means for rotating said wheel, a substantially flat coil mounted in a plane substantially tangent to said wheel, said coil when energized being in flux linking relationship with said ferromagnetic member and successive ones of said magnetically permeable characters during rotation of said wheel, and means for momentarily energizing said coil when a character on said wheel is substantially tangent to said ferromagnetic member.

4. A magnetic recording apparatus comprising a rotatable ferromagnetic cylinder, at least one wheel supported in substantially tangential relationship with said ferromagnetic cylinder and having a plurality of magnetically permeable characters about its peripheral surface, an input shaft for rotating said wheel, a substantially flat coil mounted in a plane substantially tangent to said wheel, said coil when energized being in flux linking relationship with said ferromagnetic member and successive ones of said magnetically permeable characters during rotation of said wheel, and means coupled to said input shaft for momentarily energizing said coil only when a character on said wheel is substantially tangent to said ferromagnetic cylinder.

5. A magnetic recording apparatus comprising a rotatable ferromagnetic cylinder, a wheel supported in substantially tangential relationship with said ferromagnetic cylinder and having a plurality of magnetically permeable characters about its peripheral surface, an input shaft for rotating said wheel, a substantially flat coil mounted in a plane substantially tangent to said wheel, said coil when energized being in flux linking relationship with said ferromagnetic member and successive ones of said magnetically permeable characters during rotation of said wheel, and means for momentarily energizing said coil only when a character on said wheel is substantially tangent to said ferromagnetic cylinder, said coil energizing means including a rotatable commutator wheel, contact means carried by said commutator wheel, brush means mounted to contact said contact means as said commutator wheel rotates, and means mechanically linking said commutator wheel and said input shaft.

6. A magnetic recording apparatus comprising a movable ferromagnetic member, a wheel supported in substantially tangential relationship with said ferromagnetic member, a plurality of magnetically permeable characters about the peripheral surface of said wheel, means for rotating said wheel, a substantially flat coil mounted in a plane substantially tangent to said wheel, said coil when energized being in flux linking relationship with said ferromagnetic member and successive ones of said magnetically permeable characters during rotation of said wheel, means for momentarily energizing said coil only when a character on said wheel is substantially tangent to said ferromagnetic member, a marker member having its tip adjacent said ferromagnetic member, a second coil for causing magnetic flux to pass between said tip and said ferromagnetic member when said coil is energized, and means for momentarily energizing said second coil in accordance with rotational movement of said wheel.

7. A magnetic recording apparatus comprising a rotatable ferromagnetic cylinder, a wheel supported in substantially tangential relationship with said ferromagnetic cylinder and having a plurality of magnetically permeable characters about its peripheral surface, an input shaft for rotating said wheel, a substantially flat first coil mounted in a plane substantially tangent to said wheel, said first coil when energized being in flux linking relationship with said ferromagnetic member and successive ones of said magnetically permeable characters during rotation of said wheel, a marker member having its tip adjacent said ferromagnetic cylinder and substantially on the line of tangency between said wheel and said cylinder, a second coil for causing magnetic flux to pass between said tip and said ferromagnetic cylinder when said coil is energized, and means coupled to said input shaft for momentarily energizing said first coil only when a character on said wheel is substantially tangent to said ferromagnetic cylinder and for momentarily energizing said second coil in accordance with movement of said input shaft.

8. A magnetic recording and portraying apparatus comprising a movable ferromagnetic member, at least one wheel supported in substantially tangential relationship with said ferromagnetic member, a plurality of magnetically permeable characters formed about the peripheral surface of said wheel, means for rotating said wheel, coil means mounted to substantially surround and to lie in the same plane as successive ones of said magnetically permeable characters as said wheel rotates, said coil means when energized being in flux linking relationship with said ferromagnetic member and successive ones of said characters during rotation of said wheel, means for momentarily energizing said coil means to impress a magnetic image upon said ferromagnetic member, and means for bringing minute magnetic particles into the attracting influence of said impressed magnetic image to render said image visible.

9. A magnetic recording and portraying apparatus comprising a movable ferromagnetic member, at least one wheel supported in substantially tangential relationship with said ferromagnetic member, a plurality of magnetically permeable characters about the peripheral surface of said wheel, means for rotating said wheel, a substantially flat coil mounted in a plane substantially tangent to said wheel, said coil when energized being in flux linking relationship with said ferromagnetic member and successive ones of said magnetically permeable characters during rotation of said wheel, means for momentarily energizing said coil when a character on said wheel is substantially tangent to said ferromagnetic member to impress a magnetic image of said character upon said ferromagnetic member, and means for bringing minute magnetic particles into the attracting influence of said impressed magnetic image to render said image visible.

10. A magnetic recording and portraying apparatus comprising a rotatable ferromagnetic cylinder, at least one wheel supported in substantially tangential relationship with said ferromagnetic cylinder and having a plurality of magnetically permeable characters about its peripheral surface, an input shaft for rotating said wheel, a substantially flat coil mounted in a plane substantially tangent to said wheel, said coil when energized being in flux linking relationship with said ferromagnetic member and successive ones of said magnetically permeable characters during rotation of said wheel, means coupled to said input shaft for momentarily energizing said coil when a character on said wheel is substantially tangent to said ferromagnetic cylinder to impress a magnetic image on said character upon said ferromagnetic cylinder, and means for bringing minute magnetic particles into the attracting influence of said impressed magnetic image to render said image visible.

11. A magnetic recording and portraying apparatus comprising a rotatable ferromagnetic cylinder, at least one wheel supported in substantially tangential relationship with said ferromagnetic cylinder and having a plurality of magnetically permeable characters about its peripheral surface, an input shaft for rotating said wheel, a substantially flat first coil mounted in a plane substantially tangent to said wheel, said first coil when energized being in flux linking relationship with said ferromagnetic member and successive ones of said magnetically permeable characters during rotation of said wheel, a marker member having its tip adjacent said ferromagnetic cylinder and substantially on the line of tangency between said wheel and said cylinder, a second coil for causing magnetic flux to pass between said tip and said ferromagnetic cylinder when said coil is energized, means coupled to said input shaft for momentarily energizing said first coil only when a character on said wheel is substantially tangent to said ferromagnetic cylinder and for momentarily energizing said second coil in accordance with movement of said input shaft to impress magnetic images upon said ferromagnetic cylinder, and means for bringing minute magnetic particles into the attracting influence of said impressed magnetic images to render said images visible.

12. A magnetic recording and portraying apparatus comprising a movable ferromagnetic member, at least one wheel supported in substantially tangential relationship with said ferromagnetic member, a plurality of magnetically permeable characters formed about the peripheral surface of said wheel, means for rotating said wheel, coil means mounted to substantially surround and to lie in the same plane as successive ones of said magnetically permeable characters as said wheel rotates, said coil means when energized being in flux linking relationship with said ferromagnetic member and successive ones of said characters during rotation of said wheel, means for momentarily energizing said coil means to impress a magnetic image upon said ferromagnetic member, means for bringing minute magnetic particles into the attracting influence of said impressed magnetic image, means for transferring to a print receiving member those minute magnetic particles adhering to the ferromagnetic member in the form of the impressed magnetic image, and means for erasing said impressed magnetic image from said ferromagnetic member.

13. A magnetic recording and portraying apparatus comprising a movable ferromagnetic member, at least one wheel supported in substantially tangential relationship with said ferromagnetic member, a plurality of magnetically permeable characters about the peripheral surface of said wheel, means for rotating said wheel, a substantially flat coil mounted in a plane substantially tangent to said wheel, said coil when energized being in flux linking relationship with said ferromagnetic member and successive ones of said magnetically permeable characters during rotation of said wheel, means for momentarily energizing said coil when a character is substantially tangent to said ferromagnetic member to impress a magnetic image of said character upon said ferromagnetic member, means for bringing minute magnetic particles into the attracting influence of said impressed magnetic image, means for transferring to a print receiving member those minute magnetic particles adhering to the ferromagnetic member in the form of the impressed magnetic image, and means for erasing said impressed magnetic image from said ferromagnetic member.

14. A magnetic recording and portraying apparatus comprising a rotatable ferromagnetic cylinder, at least one wheel supported in substantially tangential relationship with said ferromagnetic cylinder and having a plurality of magnetically permeable characters about its peripheral surface, an input shaft for rotating said wheel, a substantially flat coil mounted in a plane substantially tangent to said wheel, said coil when energized being in flux linking relationship with said ferromagnetic member and successive ones of said magnetically permeable characters during rotation of said wheel, means coupled to said input shaft for momentarily energizing said coil only when a character on said wheel is substantially tangent to said ferromagnetic cylinder to impress a magnetic image of said character upon said ferromagnetic cylinder, means for bringing minute magnetic particles into the attracting influence of said impressed magnetic image, means for transferring to a print receiving member those minute magnetic particles adhering to the ferromagnetic member in the form of the impressed magnetic image, and means for erasing said impressed magnetic image from said ferromagnetic cylinder.

15. A magnetic recording apparatus comprising a rotatable ferromagnetic cylinder; at least one wheel supported in substantially tangential relationship with said ferromagnetic cylinder and having a plurality of magnetically permeable characters about its peripheral surface; an input shaft for rotating said wheel; a substantially flat coil mounted in a plane substantially tangent to said wheel, said coil when energized being in flux linking relationship with said ferromagnetic member and successive ones of said magnetically permeable characters during rotation of said wheel; means for momentarily energizing said coil only when a character on said wheel is substantially tangent to said ferromagnetic cylinder to impress a magnetic image of said character upon said ferromagnetic cylinder, said coil energizing means including a rotatable commutator wheel, contact means carried by said commutator wheel, brush means mounted to contact said contact means as said commutator wheel rotates, and means mechanically linking said commutator wheel and said input shaft; means for bringing minute magnetic particles into the attracting influence of said impressed magnetic image; means for transferring to a print receiving member those minute magnetic particles adhering to the ferromagnetic member in the form of the impressed magnetic image; and means for erasing said impressed magnetic image from said ferromagnetic cylinder.

16. A magnetic recording apparatus comprising a rotatable ferromagnetic cylinder, at least one wheel supported in substantially tangential relationship with said ferromagnetic cylinder and having a plurality of magnetically permeable characters about its peripheral surface, an input shaft for rotating said wheel, a substantially flat first coil mounted in a plane substantially tangent to said wheel, said first coil when energized being in flux linking relationship with said ferromagnetic member and successive ones of said magnetically permeable characters during rotation of said wheel, a marker member having its tip adjacent said ferromagnetic cylinder and substantially on the line of tangency between said wheel and said cylinder, a second coil for causing magnetic flux to pass between said tip and said ferromagnetic cylinder when said coil is energized, means coupled to said input shaft ror momentarily energizing said first coil only when a character on said wheel is substantially tangent to said ferromagnetic cylinder and for momentarily energizing said second coil in accordance with movement of said input shaft to impress magnetic images upon said ferromagnetic member, means for bringing minute magnetic particles into the attracting influence of said impressed magnetic images, means for transferring to a print receiving member those minute magnetic particles adhering to the ferromagnetic member in the form of the impressed magnetic images, and means for erasing said impressed magnetic images from said ferromagnetic cylinder.

17. A magnetic recording apparatus comprising a movable magnetic member, at least one wheel supported with its peripheral surface in substantially tangential relationship with said magnetic member, a plurality of magnetically permeable characters about the peripheral surface of said wheel, means for rotating said wheel, and a substantially flat coil mounted in a plane substantially tangent to both said magnetic member and said peripheral surface, said coil when energized being in flux linking relationship with said magnetic member and one of said characters when said one character is substantially tangent to said magnetic member.

18. Apparatus as in claim 17 further including means for momentarily energizing said coil when a character on said wheel is substantially tangent to said magnetic member.

19. Apparatus as in claim 17 further including means for momentarily energizing said coil when a character on said wheel is substantially tangent to said magnetic member to impress magnetic images upon said magnetic member, means for bringing minute magnetic particles into the attracting influence of said impressed magnetic images, and means for transferring to a print receiving member minute magnetic particles which adhere to the magnetic member in the form of the impressed magnetic images.

References Cited in the file of this patent

UNITED STATES PATENTS

| | | |
|---|---|---|
| 1,917,509 | De Ybarrondo | July 11, 1933 |
| 2,359,617 | Bryce | Oct. 3, 1944 |
| 2,540,654 | Cohen et al. | Feb. 6, 1951 |
| 2,561,476 | Lang | July 24, 1951 |

OTHER REFERENCES

Berry et al.: Ferromagnetography, published in July 1952 issue of "General Electric Review," vol. 55, No. 4, pages 20–22 and 61.

UNITED STATES PATENT OFFICE
CERTIFICATE OF CORRECTION

Patent No. 2,836,147 May 27, 1958

Robert D. McComb

It is hereby certified that error appears in the printed specification of the above numbered patent requiring correction and that the said Letters Patent should read as corrected below.

Column 11, line 63, for "on said" read -- of said --; column 13, line 49, for "shaft ror" read -- shaft for --.

Signed and sealed this 5th day of August 1958.

(SEAL)
Attest:

KARL H. AXLINE
Attesting Officer

ROBERT C. WATSON
Commissioner of Patents